(12) United States Patent
Aoki et al.

(10) Patent No.: US 9,430,693 B2
(45) Date of Patent: Aug. 30, 2016

(54) BIOMETRIC AUTHENTICATION APPARATUS AND BIOMETRIC AUTHENTICATION METHOD

(71) Applicant: FUJITSU LIMITED, Kawasaki-shi, Kanagawa (JP)

(72) Inventors: Takahiro Aoki, Kawasaki (JP); Takashi Shinzaki, Kawasaki (JP); Hajime Nada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 8 days.

(21) Appl. No.: 14/551,207

(22) Filed: Nov. 24, 2014

(65) Prior Publication Data
US 2015/0154437 A1 Jun. 4, 2015

(30) Foreign Application Priority Data
Dec. 4, 2013 (JP) ................................. 2013-251206

(51) Int. Cl.
G06K 9/00 (2006.01)
G06K 9/62 (2006.01)

(52) U.S. Cl.
CPC ........... *G06K 9/00087* (2013.01); *G06K 9/001* (2013.01); *G06K 9/0008* (2013.01); *G06K 9/6201* (2013.01); *G06K 2009/0006* (2013.01); *G06K 2009/00932* (2013.01)

(58) Field of Classification Search
None
See application file for complete search history.

(56) References Cited

U.S. PATENT DOCUMENTS

| 2002/0048390 A1 | 4/2002 | Ikegami |
| 2009/0132603 A1 | 5/2009 | Takeno |

(Continued)

FOREIGN PATENT DOCUMENTS

| JP | 2002-133416 | 5/2002 |
| JP | 2003-186836 | 7/2003 |

(Continued)

OTHER PUBLICATIONS

Dhameliya, Mitul D. et al.,"A Multimodal Biometric Recognition System based on Fusion of Palmprint and Fingerprint," International Journal of Engineering Trend and Technology (IJETT), vol. 4, Issue 5, May 1, 2013, pp. 1908-1911, XP55190035.

(Continued)

*Primary Examiner* — David F Dunphy
(74) *Attorney, Agent, or Firm* — Fujitsu Patent Center

(57) ABSTRACT

A biometric authentication apparatus includes: a storage unit which stores identification information and authentication information of a plurality of registrants; a deletion process unit which registers, when receiving a request to delete the authentication information of any of the plurality of registrants, the identification information of the registrant to a deletion list, and deletes, from the storage unit, the authentication information of the registrant corresponding to the identification information registered on the deletion list at predetermined time; and an authentication process unit which matches the biometric information of the plurality of registrants with biometric information of a user based on the authentication information of each registrant and authentication information extracted from biometric data representing the biometric information of the user to determine whether or not to authenticate the user as any of the plurality of registrants other than the registrants corresponding to the identification information registered on the deletion list.

12 Claims, 12 Drawing Sheets

(56) References Cited

U.S. PATENT DOCUMENTS

| | | | |
|---|---|---|---|
| 2010/0223663 A1* | 9/2010 | Morimoto | G06F 21/32 726/7 |
| 2010/0316262 A1 | 12/2010 | Kuwahara | |
| 2012/0290595 A1* | 11/2012 | Kreindler | G06F 17/30374 707/756 |
| 2013/0063581 A1* | 3/2013 | Komatsu | G06K 9/00926 348/77 |

FOREIGN PATENT DOCUMENTS

| | | |
|---|---|---|
| JP | 2010-287124 A | 12/2010 |
| JP | 2011-198260 A | 10/2011 |
| WO | 2007/049654 | 5/2007 |

OTHER PUBLICATIONS

Dhananjay, D.M. et al.,"Automated PolyU Palmprint sample Registration and Coarse Classification," International Journal of Computer Science Issues (IJCSI), vol. 8, Issue 6, No. 3, Nov. 1, 2011, pp. 186-191, XP55190264.

Karu, Kalle et al.,"Fingerprint Classification," Pattern Recognition, vol. 29, No. 3, Jan. 1, 1996, pp. 389-404, XP55190266.

Extended European Search Report dated Jun. 3, 2015 for corresponding European Patent Application No. 14194676.4, 9 pages.

Korean Office Action mailed Apr. 6, 2016 for corresponding Korean Patent Application No. 10-2014-0171994, with English Translation, 9 pages.

* cited by examiner 701
702  703
700

| ID | NUMBER OF REQUESTS | NUMBER OF NOTIFICATIONS | P(ID) |
|---|---|---|---|
| ID0001 | 100 | 10 | 0.1 |
| ID0002 | 100 | 1 | 0.01 |
| ID0003 | 100 | 2 | 0.02 |
| ⋮ | | | |

START
↓
CALCULATE P(ID) FOR EACH REGISTRANT — S301
↓
IDENTIFY REGISTRANTS WHO SATISFY CONDITION FOR IMMEDIATE DELETION BASED ON P(ID), Td, N, AND Tms OF EACH REGISTRANT — S302
↓
ADD ID OF IDENTIFIED REGISTRANTS TO IMMEDIATE DELETION LIST — S303
↓
END

BIOMETRIC AUTHENTICATION APPARATUS AND BIOMETRIC AUTHENTICATION METHOD

CROSS-REFERENCE TO RELATED APPLICATION

This application is based upon and claims the benefit of priority of the prior Japanese Patent Application No. 2013-251206, filed on Dec. 4, 2013, and the entire contents of which are incorporated herein by reference.

FIELD

The embodiments discussed herein are related to a biometric authentication apparatus, a biometric authentication method, and a biometric authentication computer program.

BACKGROUND

Biometric authentication technology, which uses biometric information such as fingerprints or palm vein patterns to determine whether or not to authenticate individuals, has been developed in recent years. Biometric authentication technology has found wide application, from large-scale systems with a large number of registered users, such as access control systems, border control systems, or systems using national identification numbers, to apparatuses used by particular individuals, such as computers or mobile terminals.

Biometric authentication technology is classified into the so-called 1:1 authentication method and 1:N authentication method. In the 1:1 authentication method, identification information, such as a user name or an identification number, of a user who requests authentication is input along with the user's biometric information. Thereby, biometric information of registrants to be matched is identified from among registrants registered beforehand. Then the biometric authentication apparatus matches the user's biometric information only with the biometric information of the registrants identified. For convenience of explanation, biometric information of a user is hereinafter referred to as input biometric information and biometric information of registrants is referred to as registered biometric information.

In the 1:N authentication method, on the other hand, identification information of a user is not input to the biometric authentication apparatus and it is not possible to identify registrants to be matched. Therefore, the biometric identification apparatus matches input biometric information with all pieces of registered biometric information registered beforehand. The biometric authentication apparatus then authenticates the user as a registrant corresponding to the registered biometric information that most matches the input biometric information. Accordingly, the number of executions of the matching process increases with larger number of pieces of registered biometric information. The number of registrants may be enormous especially when the biometric authentication technology is used in a large-scale system.

Therefore, there is proposed a technique of selecting registered biometric information on the basis of data representing input biometric information, for example, information that can be obtained by performing a relatively simple process on an image capturing a fingerprint, and matching input biometric information only with the selected registered biometric information (see Japanese Laid-open Patent Publication No. 2002-133416, for example).

On the other hand, when any of the registrants of a system that uses the 1:N authentication method no longer uses the system, it is not preferable, in terms of accuracy of authentication and quantity of computation, to keep the registered biometric information of the registrant in the system. This is because when matching is performed with the biometric information of a registrant who does not use the system, computation is wasted on the unnecessary matching. In some cases, a user may be mistakenly authenticated as the registrant. However, when the system performs a process for deleting registered biometric information during execution of a biometric authentication process, the execution of the deletion process may cause a delay in the execution of the biometric authentication process. Such a delay is not preferable, since the delay prolongs the waiting time from when a user inputs biometric information until obtain the result of the authentication is obtained.

On the other hand, a technique has been proposed in which data is registered by taking deletion of the data into consideration (see International Publication No. WO 2007/049654, for example). In the technique, at the timing of data writing, management information including directory information indicating the storage location of the data on a storage medium and ID information needed for the data is generated. When at the timing of data deleting, determination is made as to whether the ID information corresponding to the data to be deleted is needed or not and then management information corresponding to the data is deleted along with the data stored on the storage medium.

SUMMARY

However, since it is not possible to reduce the amount of processing when deleting data even with the data registration technique described above, the process for deleting registered biometric information may cause a delay in the biometric authentication process.

According to one embodiment, a biometric authentication apparatus is provided. The biometric authentication information includes a storage unit which stores identification information and authentication information of each of a plurality of registrants, the authentication information being obtained from biometric information of each of the plurality of registrants, a deletion process unit which registers, when receiving a request to delete the authentication information for any of the plurality of registrants, the identification information of the registrant to a deletion list, and deletes, from the storage unit, the authentication information of the registrant corresponding to the identification information registered on the deletion list at predetermined time, and an authentication process unit which matches the biometric information of the plurality of registrants with biometric information of a user based on the authentication information of the plurality of registrants and authentication information extracted from biometric data representing the biometric information of the user acquired by a biometric information acquisition unit to determine whether or not to authenticate the user as any of the plurality of registrants other than any of the registrants corresponding to the identification information registered on the deletion list.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a diagram illustrating an example of a count management table.

FIG. 14 is an operation flowchart of an immediate deletion list update process.

DESCRIPTION OF EMBODIMENTS

A biometric authentication apparatus according to one embodiment will be described below with reference to drawings. The biometric authentication apparatus performs a biometric authentication process according to the so-called 1:N authentication method. When the biometric authentication apparatus is requested to delete information concerning a registered registrant, the biometric authentication apparatus adds identification information of the registrant to a deletion list indicating registrants to be deleted. When satisfying a condition that biometric information of a registrant corresponding to identification information registered on the deletion list is determined to match biometric information of a user, the biometric authentication apparatus does not authenticate the user as the registrant. The biometric authentication apparatus deletes information relating to the biometric authentication process for the registrant corresponding to the identification information registered on the deletion list in a time period when process load is low.

The present inventor has found that some kinds of biometric information of registrants are more likely to be determined to match biometric information of another person while other kinds are unlikely to be determined. Biometric information of registrants that is likely to be determined to match biometric information of another person tends to cause incorrect authentication referred to as false acceptance in which a user who is not a registrant is incorrectly authorized. When false acceptance occurs, a person who does not have access authority to the system incorporating the biometric authentication apparatus would improperly access to the system. Such an instance is not preferable in terms of security. Therefore, the biometric authentication apparatus extracts registrants who have biometric information that is likely to be incorrectly determined to match biometric information of another person, on the basis of the history of past matching. The biometric authentication apparatus then adds the identification information of the registrants to an immediate deletion list indicating that the registrants on the list are to be immediately deleted in response to a delete request. When the identification information of a registrant requested to be deleted is registered on the immediate deletion list, the biometric authentication apparatus immediately deletes the information relating to the biometric authentication process for the registrant without adding the identification information of the registrant to a deletion list.

Figure 1:
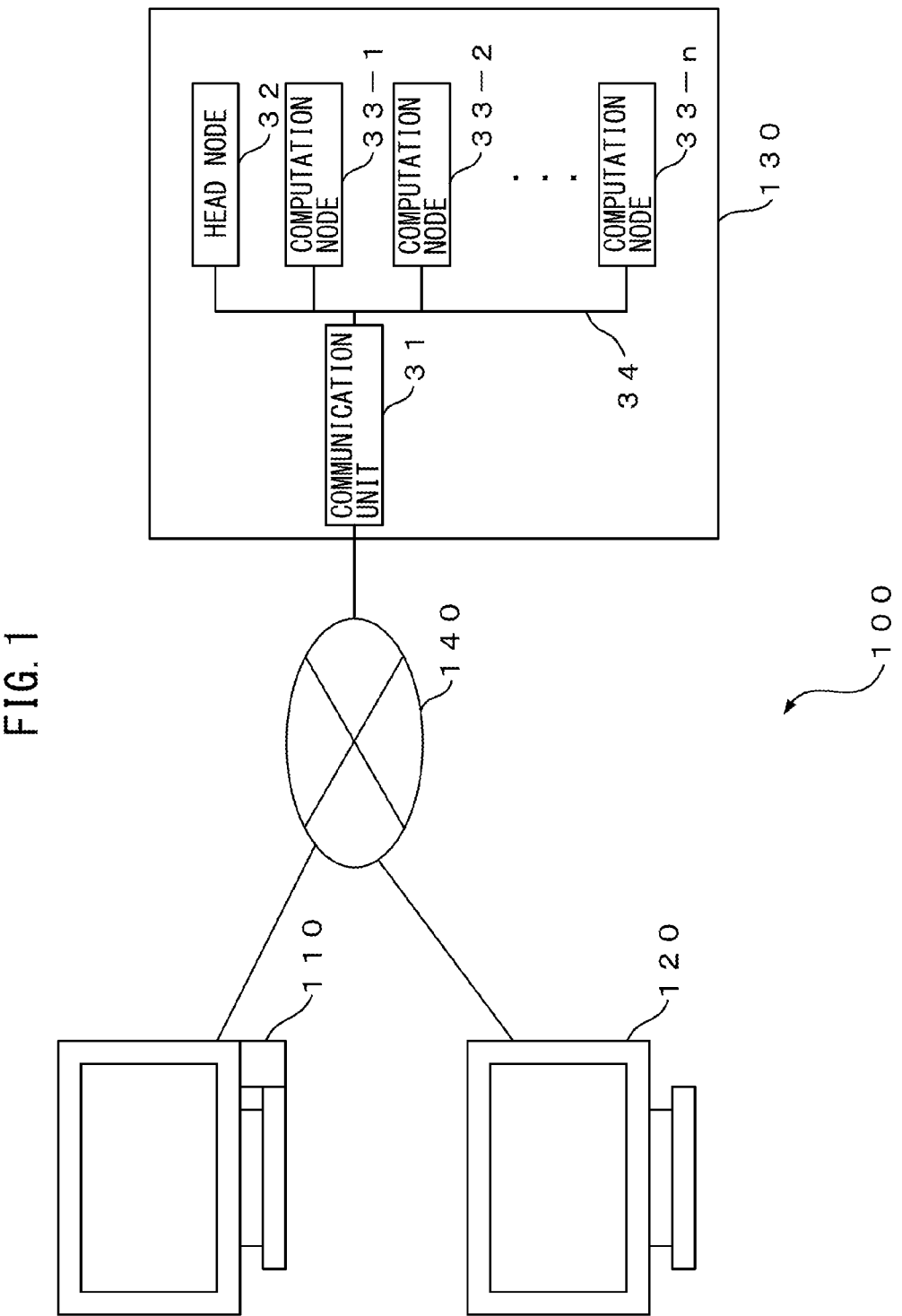
FIG. 1 is a schematic configuration diagram of a computer system that is an example of a biometric authentication apparatus.

FIG. 1 is a schematic configuration diagram of a computer system which is one example of a biometric authentication apparatus. The computer system 100 includes an authentication requesting terminal 110, a management terminal 120, and a server 130. The authentication requesting terminal 110 and the management terminal 120 are connected to the server 130 through a wired or wireless communication network 140. The numbers of authentication requesting terminals 110 and management terminals 120 included in the computer system 100 are not limited to one; there may be a plurality of authentication requesting terminals 110 and management terminals 120. Further, a plurality of servers 130 may be included in the computer system 100.

Figure 2:
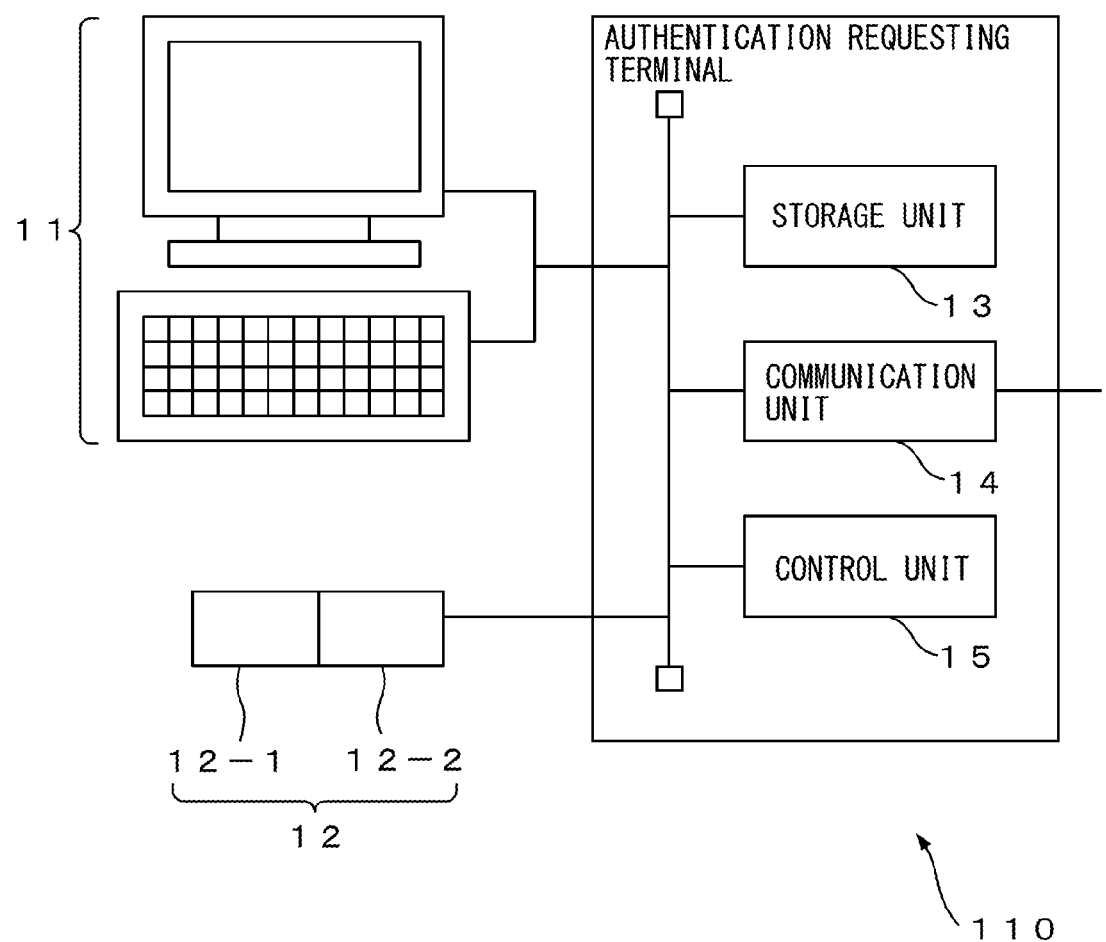
FIG. 2 is a schematic configuration diagram of an authentication requesting terminal.

FIG. 2 is a schematic configuration diagram of an authentication requesting terminal. The authentication requesting terminal 110 is a terminal for inputting biometric information of a user to the computer system 100 when the user requests authentication. The authentication requesting terminal 110 may be a fixedly installed terminal or a mobile terminal, for example. The authentication requesting terminal 110 includes a user interface unit 11, a biometric information acquisition unit 12, a storage unit 13, a communication unit 14, and a control unit 15. The user interface unit 11, the biometric information acquisition unit 12, the storage unit 13, and the communication unit 14 are connected to the control unit 15 through a signal line.

The user interface unit 11 generates an operation signal according to an operation by the user and sends the operation signal to the control unit 15. The user interface unit 11 displays, to the user, various kinds of information received from the control unit 15. For these purposes, the user interface unit 11 includes, for example, an input interface such as a keyboard or a mouse and a display device such as a liquid-crystal display. Alternatively, the user interface unit 11 may include a combined input interface/display device, such as a touch panel display.

The biometric information acquisition unit 12 acquires biometric information of a user that is used for biometric authentication and generates biometric data representing the biometric information. In this embodiment, the biometric information acquisition unit 12 includes a fingerprint sensor 12-1 and a vein sensor 12-2. The fingerprint sensor 12-1 and the vein sensor 12-2 may be separated from each other or may be integrated together. The fingerprint sensor 12-1 acquires the fingerprint of one of the fingers of the user as biometric information and generates a fingerprint image representing the fingerprint as biometric data. The vein sensor 12-2, on the other hand, acquires the vein pattern of one of the palms of the user as biometric information and generates a vein image representing the vein pattern as biometric data. The biometric information acquisition unit 12 outputs the fingerprint image and the vein image to the control unit 15.

Note that the number of kinds of biometric information of a user acquired by the biometric information acquisition unit 12 is not limited to two; the biometric information acquisition unit 12 may acquire one, or three or more kinds of biometric information. The biometric information acquired by the biometric information acquisition unit 12 is not limited to the finger prints and the vein patterns; the biometric information acquisition unit 12 may acquire a palm print, an iris pattern, or the voice of the user, for example. Further, biometric data is not limited to images; biometric data may be a speech signal, for example.

The storage unit 13 includes a nonvolatile or volatile semiconductor memory circuit and temporarily stores biometric data generated by the biometric information acquisition unit 12. The storage unit 13 also stores identification information of the authentication requesting terminal 110 (for example, the IP address for identifying the authentication requesting terminal 110 on the communication network), various programs executed by the control unit 15, and various kinds of information used for executing the programs.

The communication unit 14 includes an interface circuit for connecting the authentication requesting terminal 110 to the communication network 140. The communication unit 14 sends an authentication request received from the control unit 15 to the server 130 through the communication network 140. The communication unit 14 passes, to the control unit 15, information indicating the authentication result received from the server 130 through the communication network 140.

The control unit 15 includes one or a plurality of processors and their peripheral circuits, and controls the components of the authentication requesting terminal 110. The control unit 15 executes various programs that run on the authentication requesting terminal 110. When a user requests authentication through the user interface unit 11, the control unit 15 causes the biometric information acquisition unit 12 to operate. When the control unit 15 receives biometric data representing biometric information of the user from the biometric information acquisition unit 12, the control unit 15 generates an authentication request including the biometric data and the identification information of the authentication requesting terminal 110. The control unit 15 then sends the authentication request to the server 130 through the communication unit 14 and the communication network 140.

Figure 3:
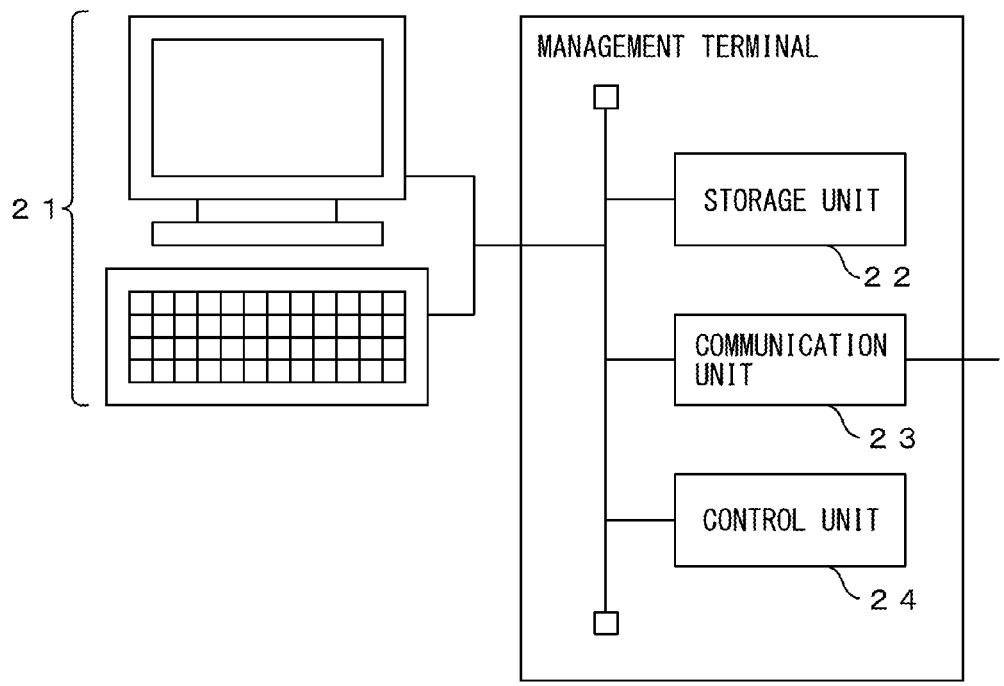
FIG. 3 is a schematic configuration diagram of a management terminal.

FIG. 3 is a schematic configuration diagram of a management terminal. The management terminal 120 is a terminal used for managing the computer system 100. Similarly to the authentication requesting terminal 110, the management terminal 120 may be a fixedly installed terminal or a mobile terminal, for example. The management terminal 120 generates, for example, a signal requesting to delete registered biometric information of a registrant registered in the computer system 100, and outputs the signal to the server 130. Accordingly, the management terminal 120 includes a user interface unit 21, a storage unit 22, a communication unit 23, and a control unit 24. The management terminal 120 differs from the authentication requesting terminal 110 in that the management terminal 120 does not include the biometric information acquisition unit.

When an administrator manipulates the user interface unit 21 to input identification information of a registrant to request deletion of registered biometric information of the registrant, the control unit 24 generates a delete request including the identification information of the registrant. The control unit 24 then sends the delete request to the server 130 through the communication unit 23 and the communication network 140.

Note that the authentication requesting terminal 110 may include the functions of the management terminal 120. In that case, the management terminal 120 may be omitted.

The server 130 includes a communication unit 31, a head node 32, and at least one computation node 33 (one or more computation nodes 33-1 to 33-n, where n is an integer equal to or greater than 1). The communication unit 31 and the computation nodes 33-1 to 33-n are connected to the head node 32 through a local area network 34 that is logically or physically distinguished from the communication network 140.

The communication unit 31 includes an interface circuit for connecting the server 130 to the communication network 140. The communication unit 31 may include a firewall in order to distinguish the local area network 34 from the communication network 140. The communication unit 31 passes information received from the authentication requesting terminal 110 or the management terminal 120 to the head node 32 through the communication network 140. The communication unit 31 outputs information representing the result of authentication received from the head node 32 to the authentication requesting terminal 110 through the communication network 140.

Figure 4:
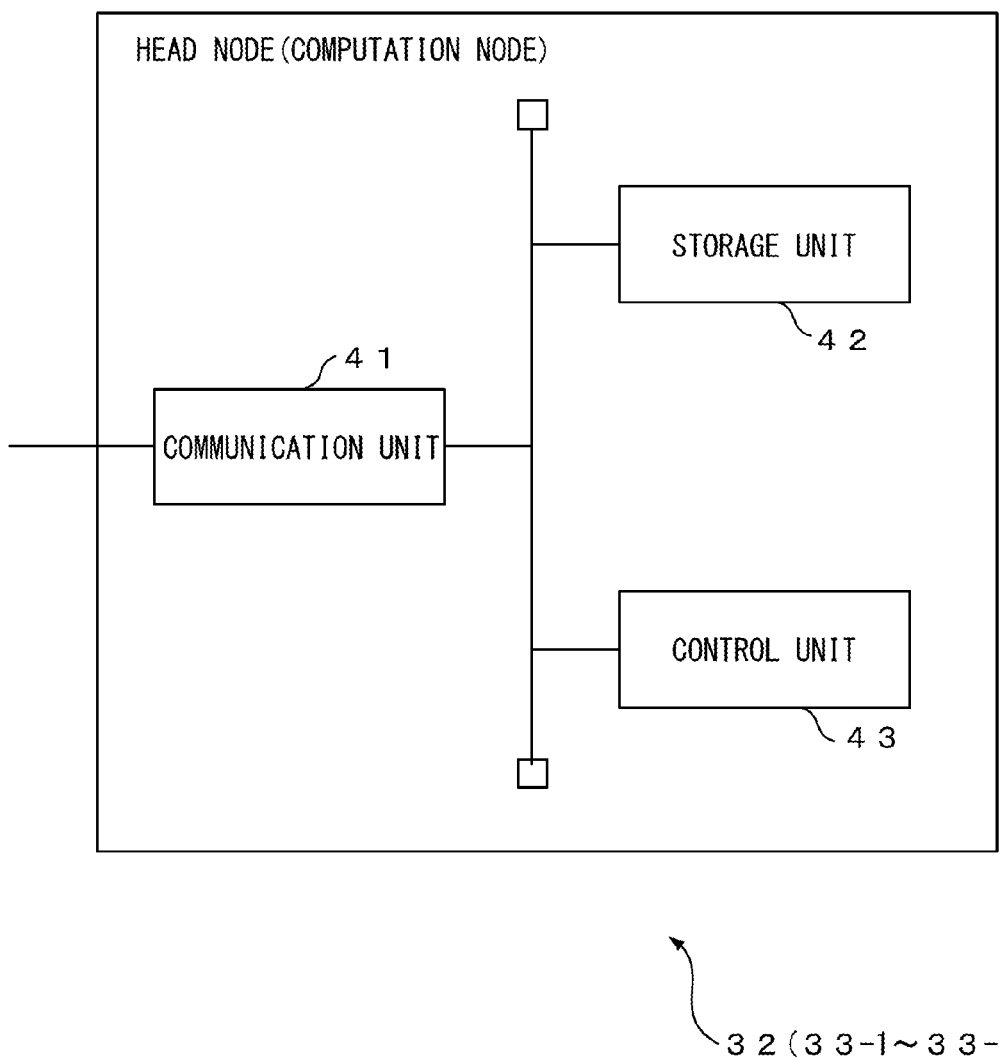
FIG. 4 is a schematic configuration diagram of a head node.

FIG. 4 is a schematic configuration diagram of the head node 32. The head node 32 may be a rack-mountable server, for example, and includes a communication unit 41, a storage unit 42, and a control unit 43.

The communication unit 41 includes an interface circuit for connecting the head node 32 to the local area network 34. The communication unit 41 passes, to the control unit 43, information received from the authentication requesting terminal 110 or the management terminal 120 through the communication unit 31, or information received from each computation node. The communication unit 41 sends information received from the control unit 43 to each computation node or the communication unit 31.

The storage unit 42 includes at least one of a semiconductor memory, a magnetic disk device, and an optical disc device, for example. The storage unit 42 stores various computer programs that run on the head node 32 and a registrant database or the like in which identification information, biometric features for selection, and biometric features for matching of all of the registrants are registered. The storage unit 42 also stores an allocation list for each computation node that indicates the identification information of registrants for which the computation node performs a selection process and a matching process. The storage unit 42 also stores a deletion list. In addition, the storage unit 42 stores an immediate deletion list.

The control unit 43 includes one or a plurality of processors and their peripheral circuits. The control unit 43 executes a part of a biometric authentication process using the 1:N authentication method on the basis of biometric data representing biometric information of a user received from the authentication requesting terminal 110. When the control unit 43 receives a delete request to delete registered biometric information, the control unit 43 updates the deletion list and deletes the registered biometric information at a predetermined timing. The control unit 43 also updates the immediate deletion list.

The computation nodes 33-1 to 33-n may each be a rack-mountable server, for example. The head node 32 and the computation nodes 33-1 to 33-n are not limited to rack-mountable servers and may be any computers that can communicate with one another through the local area network 34. The head node 32 and the computation nodes 33-1 to 33-$n$ differ from each other only in processes executed on each of the nodes and information stored on each of the nodes. The computation nodes 33-1 to 33-$n$ may have the same configuration as the head node 32 illustrated in FIG. 4. Therefore, refer to the description of the configuration of the head node 32 for the hardware configuration of each of the computation nodes 33-1 to 33-$n$.

Details of a biometric authentication process executed by the computer system 100 will be described below.

Figure 5:
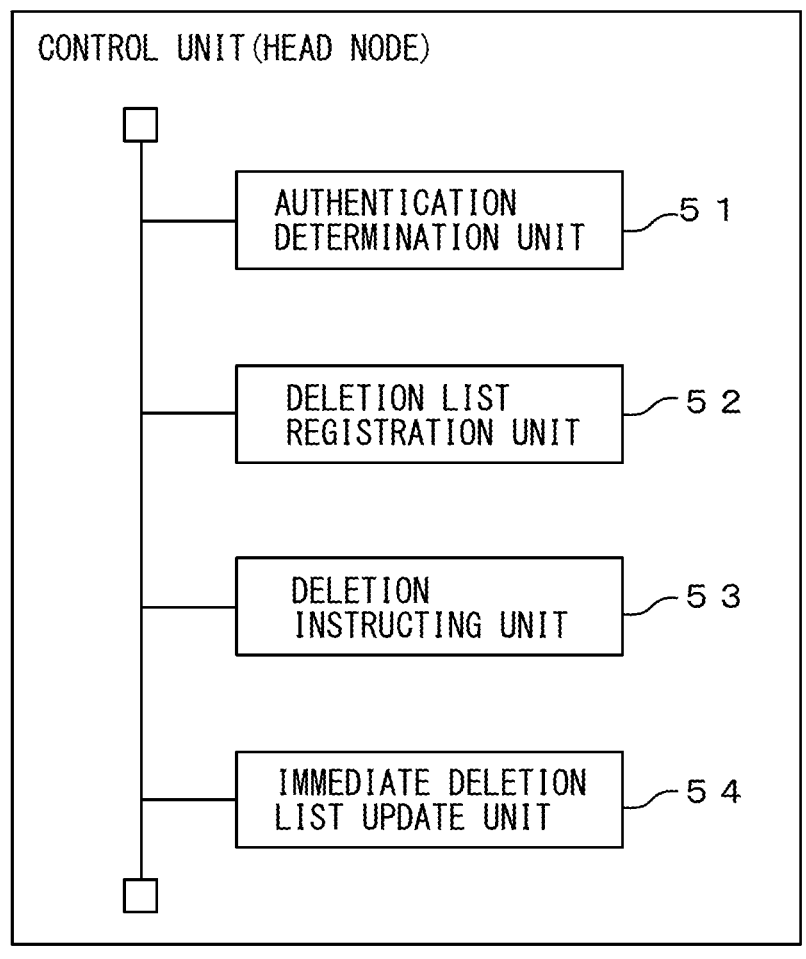
FIG. 5 is a functional block diagram of a control unit of the head node.

FIG. 5 is a functional block diagram of the control unit 43 of the head node 32. The control unit 43 includes an authentication determination unit 51, a deletion list registration unit 52, a deletion instructing unit 53, and an immediate deletion list update unit 54. The authentication determination unit 51, the deletion list registration unit 52, the deletion instructing unit 53, and the immediate deletion list update unit 54 are functional modules implemented by computer programs running on the processor included in the control unit 43 of the head node 32. Alternatively, the authentication determination unit 51, the deletion list registration unit 52, the deletion instructing unit 53, and the immediate deletion list update unit 54 may be mounted on the head node 32 separately from the processor included in the control unit 43 as an integrated circuit that implement the functions of these units.

Figure 6:
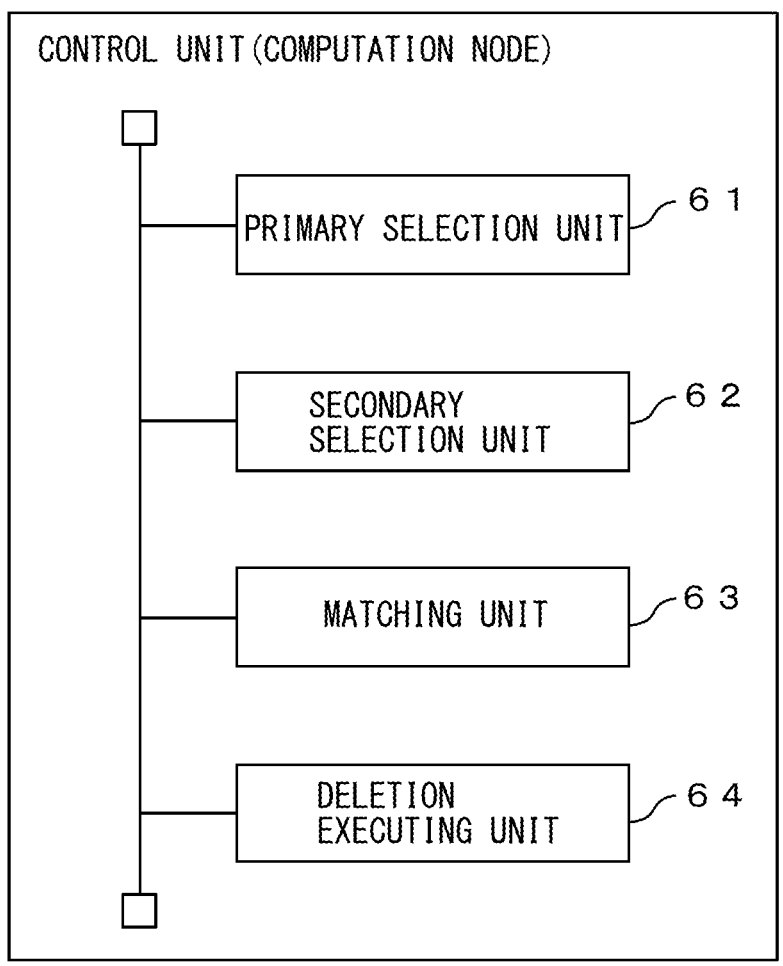
FIG. 6 is a functional block diagram of a control unit of a computation node.

FIG. 6 is a functional block diagram of the control unit 43 of each of the computation nodes 33-1 to 33-$n$. The control unit 43 includes a primary selection unit 61, a secondary selection unit 62, a matching unit 63, and a deletion executing unit 64. The primary selection unit 61, the secondary selection unit 62, the matching unit 63, and the deletion executing unit 64 are functional modules implemented by computer programs running on the processor included in the control unit 43 of each of computation nodes 33-1 to 33-$n$. Alternatively, the primary selection unit 61, the secondary selection unit 62, the matching unit 63, and the deletion executing unit 64 may be mounted on each of computation nodes 33-1 to 33-$n$ separately from the processor included in the control unit 43 as an integrated circuit that implements the functions of these units.

The authentication determination unit 51, the primary selection unit 61, the secondary selection unit 62, and the matching unit 63 among the units depicted in the functional block diagrams in FIGS. 5 and 6 are a part of a biometric authentication process unit and operate when determining whether or not to authenticate a user. The primary selection unit 61, the secondary selection unit 62, and the matching unit 63 among these units are a part of a selection process unit. On the other hand, the deletion list registration unit 52, the deletion instructing unit 53, and the deletion executing unit 64 are a part of a deletion process unit and operate when deleting registered biometric information. The immediate deletion list update unit 54 operates when updating an immediate deletion list. Details of each of the processes will be described below.

(Biometric Authentication Process)

When the head node 32 receives an authentication request from the authentication requesting terminal 110, the head node 32 transfers user's biometric data included in the authentication request, which is a fingerprint image and a vein image in this embodiment, to the computation nodes 33-1 to 33-$n$ through the communication unit 41 and the local area network 34. Note that the authentication requesting terminal 110 may send, as the user's biometric data, feature data which is used for authentication and extracted from a fingerprint image or a vein image, instead of the fingerprint image or the vein image itself. In that case, the authentication requesting terminal 110 executes a feature extraction process and sends feature data obtained as a result of the extraction to the head node 32. The head node 32 transfers the feature data to each of the computation nodes 33-1 to 33-$n$ as user's biometric data. The head node 32 then sends a matching request command instructing each of the computation nodes 33-1 to 33-$n$ to execute a matching process.

When each of the computation nodes 33-1 to 33-$n$ receives user's biometric data from the head node 32, the primary selection unit 61 and the secondary selection unit 62 select registrants to be matched with the biometric information of the user from among registrants stored on the storing unit 42. Then, the matching unit 63 of each of computation nodes 33-1 to 33-$n$ calculates the degree of similarity between the biometric information of each of the selected registrants and the biometric information of the user. Each of computation nodes 33-1 to 33-$n$ then notifies the head node 32 of the degrees of similarity equal to or greater than a threshold value and the identification information of the registrants corresponding to the degrees of similarity. When the authentication determination unit 51 of the head node 32 finds identification information that matches identification information registered on the deletion list among the pieces of identification information of the registrants notified by the computation nodes 33-1 to 33-$n$, the head node 32 excludes the registrants corresponding to the matching identification information from the authentication target. Based on the degrees of the similarity, the head node 32 determines whether or not to authenticate the user as any of the registrants that correspond to the notified identification information and have not been excluded.

A process performed in each of the computation nodes 33-1 to 33-$n$ will be described first. Each of the computation nodes 33-1 to 33-$n$ performs the same process; therefore the process in the computation node 33-1 will be described below.

The storage unit 42 of the computation node 33-1 stores, for each of the registrants of approximately 1/n registrants among all the registrants registered in the computer system 100, identification information (for example, a user name or a user identification number), features for matching, and features for selection. The features for matching represent features of the biometric information of the registrants and are used in the matching process. The features for selection represent features of the biometric information of the registrants and are used for selecting registrants for the matching process. Note that in order to distribute the computation loads of the matching process and the selection process, preferably different computation nodes store different registrants. In this embodiment, the features for selection include a feature for primary selection used in the primary selection unit 61 and a feature for secondary selection used in the secondary selection unit 62. In this embodiment, the feature for primary selection is a flag indicating left-right classification of the hand of a registrant for whom the matching features and the feature for secondary selection have been extracted. The feature for secondary selection is an index indicating the type of a fingerprint of a registrant classified on the basis of singular points of the fingerprint.

The primary selection unit 61 selects registrants who may be the user from among the registrants stored on the computation node 33-1. In order to reduce the computation loads on the computation nodes, the amount of computation in the primary selection process executed in the primary selection unit 61 is preferably smaller than the amounts of computation in the processes executed in the secondary selection unit 62 and the matching unit 63.

In this embodiment, the primary selection unit 61 determines whether the hand in a fingerprint image or a vein image, which is biometric data of a user, is the right hand or the left hand of the user. The primary selection unit 61 provides the result of the determination as the feature for primary selection. The primary selection unit 61 then selects registrants having the feature for primary selection that is identical to the feature of the user for primary selection, i.e., registrants for whom the matching features indicating the biometric information of the same left-right classification as that of the hand appearing in the fingerprint image or vein image of the user is registered. An example will be described below in which determination is made as to whether the hand of a user is right or left on the basis of a vein image. However, the primary selection unit 61 is able to use the same process when determining whether the user's hand is right or left on the basis of a fingerprint image.

The primary selection unit 61 distinguishes between a subject region in a vein image where an image of a palm is captured and a background region where an image of the palm is not captured. For example, the brightness values of pixels of the region where a palm is captured are higher than the brightness values of pixels of the region where a palm is not captured. Therefore, the primary selection unit 61 classifies a set of pixels having brightness values equal to or greater than a subject determination threshold value as a subject region, for example. Further, the primary selection unit 61 classifies a set of pixels having brightness values less than the subject determination threshold value as the background region, thus binarizing the vein image. The subject determination threshold value may be preset to a fixed value (10, for example) or may be set to the average of the brightness values of the pixels in the vein image, for example.

The primary selection unit 61 then detects the position of the base of the thumb on the basis of the subject region. The position of the base of the thumb is closer to the wrist than the bases of the other fingers. Accordingly, the primary selection unit 61 determines that the base closest to the wrist is the position of the base of the thumb. When the position of the base of the thumb is close to the left edge of the subject region, the primary selection unit 61 determines that the hand of the user in the vein image is the left hand. On the other hand, when the position of the base of the thumb is close to the right edge of the subject region, the primary selection unit 61 determines that the hand of the user in the vein image is the right hand.

In order to detect the position of the base of the fingers including thumb, the primary selection unit 61 scans across the binarized vein image from one end to the other end pixel-line by pixel-line from the wrist side to the finger side. The primary selection unit 61 thereby detects a pixel line in which there are pixels of the background region surrounded by the subject region on both sides on the pixel line. On the first pixel line detected, the primary selection unit 61 detects the position of background pixels surrounded by the subject region on both sides as the position of the base of the thumb. For example, when the wrist appears at the lower side of the binarized vein image and the fingertips appear at the upper side of the binarized vein image, the primary selection unit 61 performs the aforementioned scanning from the pixel line at the bottom of the binarized vein image. The primary selection unit 61 then compares the distance from the position of the base of the thumb to the left edge of the subject region with the distance from the position of the base of the thumb to the right edge of the subject region. When the distance from the position of the base of the thumb to the left edge of the subject region is shorter, the primary selection unit 61 determines that the hand of the user is the left hand. On the other hand, when the distance from the position of the base of the thumb to the right edge of the subject region is shorter, the primary selection unit 61 determines that the hand of the user is the right hand. Note that the primary selection unit 61 may detect the position of the base of the thumb according to any of various other methods for detecting the position of the thumb. For example, the primary selection unit 61 may detect the position of the base of the thumb by tracking the boundary between the subject region and the background region as disclosed in Jixing Wang et al., "Palm Vein for Efficient Person Recognition Based on 2D Gabor Filter", Proc. of SPIE, vol. 8712.

The primary selection unit 61 selects registrants for whom matching features of biometric information on hand of the same left-right classification as the user's hand appearing in the vein image is registered, from among the registrants registered on the computation node 33-1. The primary selection unit 61 notifies the secondary selection unit 62 of the identification information of the selected registrants.

The secondary selection unit 62 selects registrants for the matching process from among the registrants selected by the primary selection unit 61. In order to reduce the computation loads on the computation nodes, the amount of computation in the secondary selection process executed in the secondary selection unit 62 is preferably smaller than the amount of computation in the matching process executed in the matching unit 63.

In this embodiment, the secondary selection unit 62 obtains the type of a fingerprint of the user as the feature for secondary selection. The secondary selection unit 62 then selects registrants having the feature for secondary selection identical to the user's feature for secondary selection, i.e., the registrants having the same type of fingerprint as the user. The type of fingerprint may be determined according to the arrangement of singular points such as a whorl core and deltas on the fingerprint.

Figure 7A:
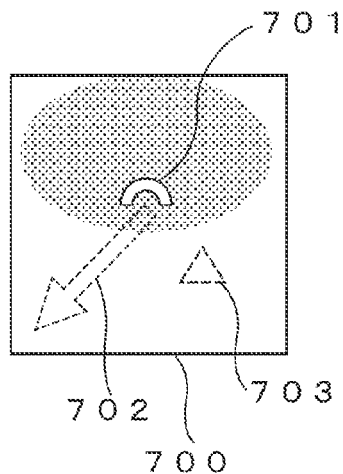
FIGS. 7A to 7C are schematic diagrams of fingerprints, representing typical types of fingerprints.
Figure 7B:
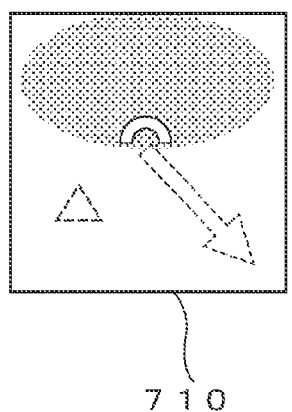
Figure 7C:
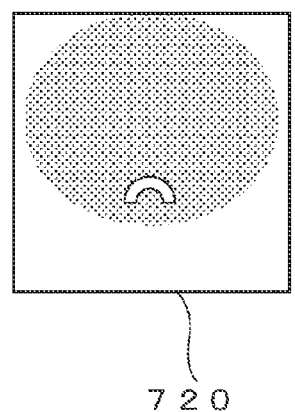

FIGS. 7A to 7C are schematic diagrams illustrating typical types of fingerprints. The upward ark in each of the diagrams represents a whorl core 701 in which a ridge is convexed upward. Arrow 702 represents the direction of the ridge forming the whorl core. The triangle represents a delta 703.

The fingerprint 700 depicted in FIG. 7A is a so-called right loop fingerprint. The fingerprint 700 includes the whorl core 701 and one delta 703. In the right loop fingerprint 700, the delta 703 exists at the right of the whorl core 701 and the direction 702 of the ridge forming the whorl core 701 is facing down-left direction from the whorl core 701. On the other hand, the fingerprint 710 depicted in FIG. 7B is a so-called left loop fingerprint. The fingerprint 710 has a structure that is mirror-symmetrical to the right loop fingerprint 700. The fingerprint 720 depicted in FIG. 7C is a so-called arc-pattern fingerprint. The fingerprint 720 has a whorl core 701 but does not have other singular points.

When the fingerprint of the user's finger in the fingerprint image is of the right loop type, for example, the secondary selection unit 62 selects registrants having right loop fingerprints. On the other hand, when the fingerprint of the user's finger in the fingerprint image is of the arc-pattern type, the secondary selection unit 62 selects registrants having arc-pattern fingerprints.

In order to determine the type of the fingerprint of the user, the secondary selection unit 62 extracts a set of pixels having brightness values equal to or greater than a predetermined brightness value (10, for example) from the fingerprint image, for example, as the subject region in which a finger is captured. The brightness value of the pixels corresponding to a ridge in a fingerprint differs from the brightness value of the pixels corresponding to a valley line. Therefore, the secondary selection unit 62 binarizes the pixels in the subject region into pixels having brightness values greater than a threshold value that is equal to the intermediate brightness value between the brightness value of the pixels corresponding to the ridges and the brightness value of the pixels corresponding to the valley lines, and the pixels having the brightness values smaller than the threshold value. Thereby, the ridges and the valley lines have different values. The secondary selection unit 62 then applies a thinning process to the binarized subject region to generate thinned binary image having thinned ridges. The secondary selection unit 62 uses a plurality of templates corresponding to any of singular points such as a whorl core or delta in a fingerprint to scan the thinned binary image. Thereby, the secondary selection unit 62 detects positions in the thinned binary image that match any of the templates as the positions of singular points. The secondary selection unit 62 determines that the singular points represented in the templates that match the detected positions are located at the detected positions.

The secondary selection unit 62 refers to a table indicating the relationship between the types and positions of singular points and the types of fingerprints to determine that the fingerprint type corresponding to detected singular points is the fingerprint type of a user appearing in the fingerprint image. The secondary selection unit 62 refers to the index indicating the fingerprint type of each registrant, which is the feature for secondary selection, to select the registrants having the same fingerprint type as the user. The secondary selection unit 62 then notifies the matching unit 63 of the identification information of the selected registrants.

Note that the secondary selection unit 62 may select registrants on the basis of features of biometric information of the user other than the fingerprint type. For example, the secondary selection unit 62 may select registrants having a ridge width nearly equal to the width of ridges of the user's finger. For example, when the average width of ridges of the user's finger is 5 pixels, the secondary selection unit 62 may select registrants having ridge widths in the range of 4 to 6 pixels.

The matching unit 63 matches biometric information of each of the registrants selected by the secondary selection unit 62 with biometric information represented by the biometric data of the user, to calculate the degree of similarity between the biometric information of the registrant and the biometric information of the user. Since a fingerprint image and a vein image have been acquired as the biometric data in this embodiment, the matching unit 63 calculates the degree of similarity for each of the fingerprint and the vein pattern.

For example, the matching unit 63 matches the fingerprint of the user with the fingerprints of the registrants using minutiae matching. Accordingly, the matching unit 63 extracts minutiae such as ridge bifurcations or endings from the fingerprint image of the user. Therefore, the matching unit 63 uses a plurality of templates corresponding to either ridge bifurcations or endings in order to scan the thinned binary image having thinned ridges, generated by the secondary selection unit 62. The matching unit 63 extracts, as minutia, the center pixel of a position in the thinned binary image that matches any of the templates. The matching features of the registrants include information indicating the coordinates of the position and type of each minutia.

The matching unit 63 refers to the matching features of the registrant to align minutiae of the fingerprint of the registrant with minutiae of the fingerprint of the user. The matching unit 63 is able to calculate the degree of similarity by dividing the number of fingerprint minutiae of the registrant that match fingerprint minutiae of the user by the number of the fingerprint minutiae of the user.

Alternatively, the matching unit 63 may use pattern matching to match the fingerprint of the user with the fingerprints of the registrants. In this case, the matching unit 63 calculates normalized cross-correlation values while changing the relative position relationship between the fingerprint image of the user and the fingerprint image of each registrant. The matching unit 63 determines that the largest value among the normalized cross-correlation values is the degree of similarity.

The matching unit 63 is able to calculate the degree of similarity between the vein pattern of the user and the vein pattern of each registrant in the same way. For example, the matching unit 63 may calculate, as the degree of similarity, the largest value among normalized cross-correlation values obtained by performing pattern matching between each of the registered vein images indicating registrants' vein patterns stored in the storage unit as matching features and the vein image of the user.

Alternatively, the matching unit 63 may extract feature points such as vein endings and bifurcations from the user's vein image and may calculate the degree of similarity in the same way as in the minutiae matching.

Note that the matching unit 63 preferably normalizes each of the degrees of similarity so that the degrees of similarity calculated for fingerprint and the degrees of similarity calculated for vein pattern fall within the same range of values (0 to 100, for example). This facilitates the combined use of the degree of similarity in fingerprint and the degree of similarity in vein pattern in authentication by the authentication determination unit 51 of the head node 32.

The matching unit 63 selects registrants having the degrees of similarity in fingerprint and vein pattern that are both equal to or greater than a predetermined threshold value or a predetermined number of registrants having the larger total values of degrees of similarity. The predetermined threshold value may be set at the maximum degree of similarity multiplied by a value in the range of 0.5 to 0.6, for example. The predetermined number may be set at a value in the range from $\frac{1}{100}$ to $\frac{1}{1000}$ of the number of the registrants stored on one computation node, for example. The matching unit 63 notifies the head node 32 of the degrees of similarity in fingerprint and vein pattern of the selected registrants along with the identification information of the registrants. According to a variation, the matching unit 63 may notify the head node 32 of the degrees of similarity and identification information of all of the registrants for whom the degrees of similarity have been calculated.

A process performed in the head node 32 will now be described. The authentication determination unit 51 of the head node 32 determines whether or not the identification information of each of the registrants notified by the computation nodes is registered on the deletion list. The authentication determination unit 51 then calculates a matching score for each of the registrants corresponding to the identification information that is not registered on the deletion list, on the basis of the degree of similarity of the registrant.

Figure 8:
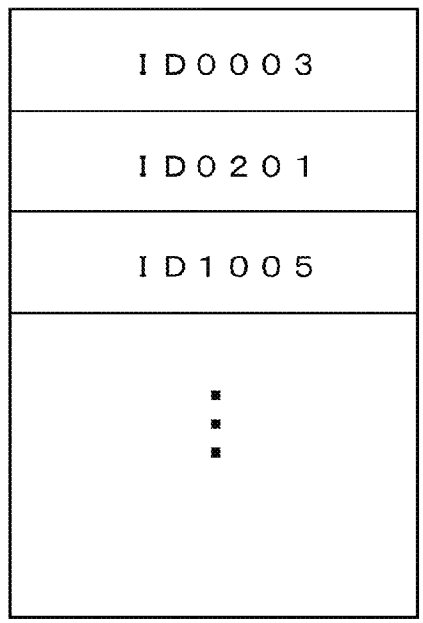
FIG. 8 is a diagram illustrating an example of a deletion list.

FIG. 8 is a diagram illustrating one example of the deletion list. The deletion list 800 contains the identification information of registrants to be deleted, ID0003, ID0201 and ID1005 in this example. It is assumed that ID0005, ID0077, ID0201, ID0824, and ID2580 have been notified by the computation nodes as the identification information of the registrants that are likely to be the user. Among the pieces of identification information notified, ID201 is registered on the deletion list 800 in this example. Accordingly, the authentication determination unit 51 does not calculate a matching score for ID0201, and calculates matching scores only for ID0005, ID0077, ID0824, and ID2580.

For example, the authentication determination unit 51 calculates the matching scores according to the following equation:

$$\text{matching score} = \alpha \times Sf + (1-\alpha) \times Sv \tag{1}$$

where Sf is the degree of similarity in fingerprint and Sv is the degree of similarity in vein pattern, and $\alpha$ is a weighting factor. For example, $\alpha$ is set to a value in the range of 0 to 1 so that the degree of similarity in vein pattern or the degree of similarity in fingerprint, whichever is more reliable, has more weight. In a variation, when the server 130 performs a biometric authentication process based on only one kind of biometric information, the authentication determination unit 51 may use the degree of similarity itself for the biometric information as the matching score.

The authentication determination unit 51 compares the maximum value of the matching score with an authentication threshold value and, when the maximum value is equal to or greater than the authentication threshold value, authenticates the user as the registrant corresponding to the maximum value. When the authentication determination unit 51 authenticates the user, the authentication determination unit 51 permits the user to use the functions of the computer system 100 that require authentication. On the other hand, when the maximum value of the matching score is less than the authentication threshold value, the authentication determination unit 51 does not authenticate the user and does not permit the user to use the functions of the computer system 100 that require authentication. The authentication determination unit 51 notifies the authentication requesting terminal 110 that has requested authentication of the authentication result.

Note that the authentication threshold value is preferably set to a value such that the authentication determination unit 51 successfully authenticates a user only when the user is a registrant him/herself. The authentication threshold value is preferably set to a value such that the authentication determination unit 51 fails to authenticate a user when the user is not a registrant but another person. For example, the authentication threshold value may be equal to the difference between the maximum and minimum values that the matching score can take, multiplied by a value in the range of 0.7 to 0.8, plus the minimum value of the matching score.

The authentication determination unit 51 updates a count management table in which there are recorded the number of times a matching request command has been sent to the computation nodes and the number of times identification information has been notified to the head node that the registrant may be the user. Details of the count management table will be described later in conjunction with an immediate deletion list update process.

Figure 9:
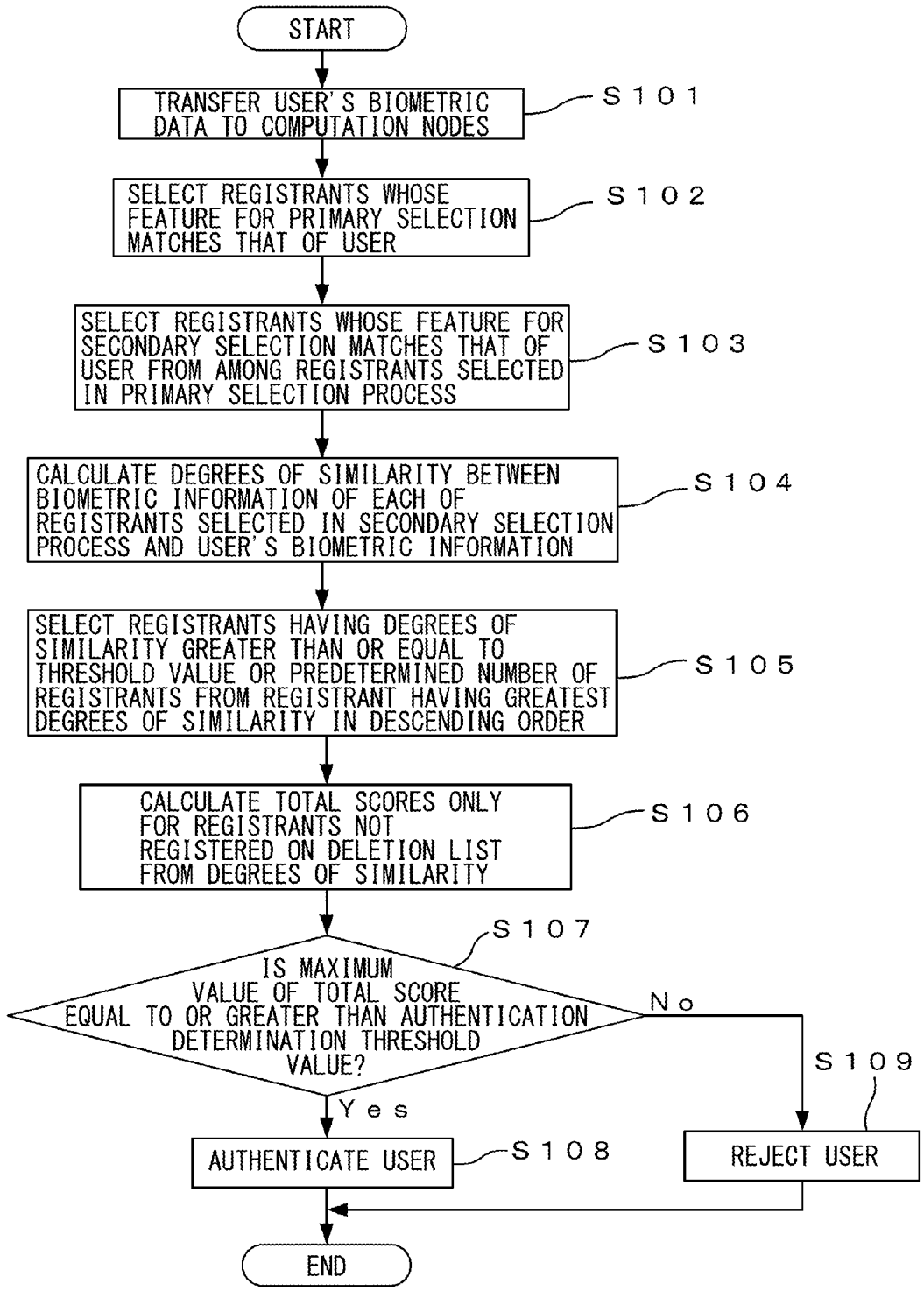
FIG. 9 is an operation flowchart of a biometric authentication process.

FIG. 9 is an operation flowchart of a biometric authentication process. When the head node 32 receives an authentication request from an authentication requesting terminal 110, the head node 32 transfers biometric data of the user included in the authentication request to the computation nodes 33-1 to 33-n (Step S101).

The primary selection unit 61 of each of the computation nodes 33-1 to 33-n extracts a feature for primary selection from biometric data and selects registrants for secondary selection from among the registrants registered in the computation node on the basis of the feature for primary selection (Step S102). Then, the secondary selection unit 62 of each of the communication nodes 33-1 to 33-n extracts a feature for secondary selection from the biometric data, and selects registrants to be matched from among the selected registrants on the computation node on the basis of the feature for secondary selection (Step S103).

The matching unit 63 of each of the computation nodes 33-1 to 33-n calculates, for each of the registrants selected by the secondary selection unit 62, the degree of similarity between the biometric information of the registrant and the biometric information represented in the biometric data of the user (Step S104). The matching unit 63 of each of the computation nodes 33-1 to 33-n selects registrants having the degrees of similarity that are equal to or greater than a threshold value, or a predetermined number of registrants from the registrant having the greatest degrees of similarity in descending order (Step S105). The matching unit 63 of each of the computation nodes 33-1 to 33-n then notifies the head node 32 of the identification information and the degrees of the similarity of the selected registrants.

The authentication determination unit 51 of the head node 32 calculates matching scores from the degrees of similarity for the registrants having identification information that is not on the deletion list among the identification information notified by the computation nodes 33-1 to 33-n (Step S106). The authentication determination unit 51 then determines whether or not the maximum value of the matching score is equal to or greater than an authentication threshold value (Step S107). When the maximum value of the matching score is equal to or greater than the authentication threshold value (YES at Step S107), the authentication determination unit 51 authenticates the user as the registrant corresponding to the maximum value (Step S108). On the other hand, when the highest matching score is less than the authentication threshold (NO at Step S107), the authentication determination unit 51 does not authenticate the user (Step S109).

After Step S108 or S109, the computer system 100 ends the biometric authentication process.

(Registered Information Deletion Process)

A registered information deletion process for deleting information (identification information, features for matching, and features for selection, for example) of registrants registered in the computer system 100, that relates to the biometric authentication process will now be described.

Figure 10:
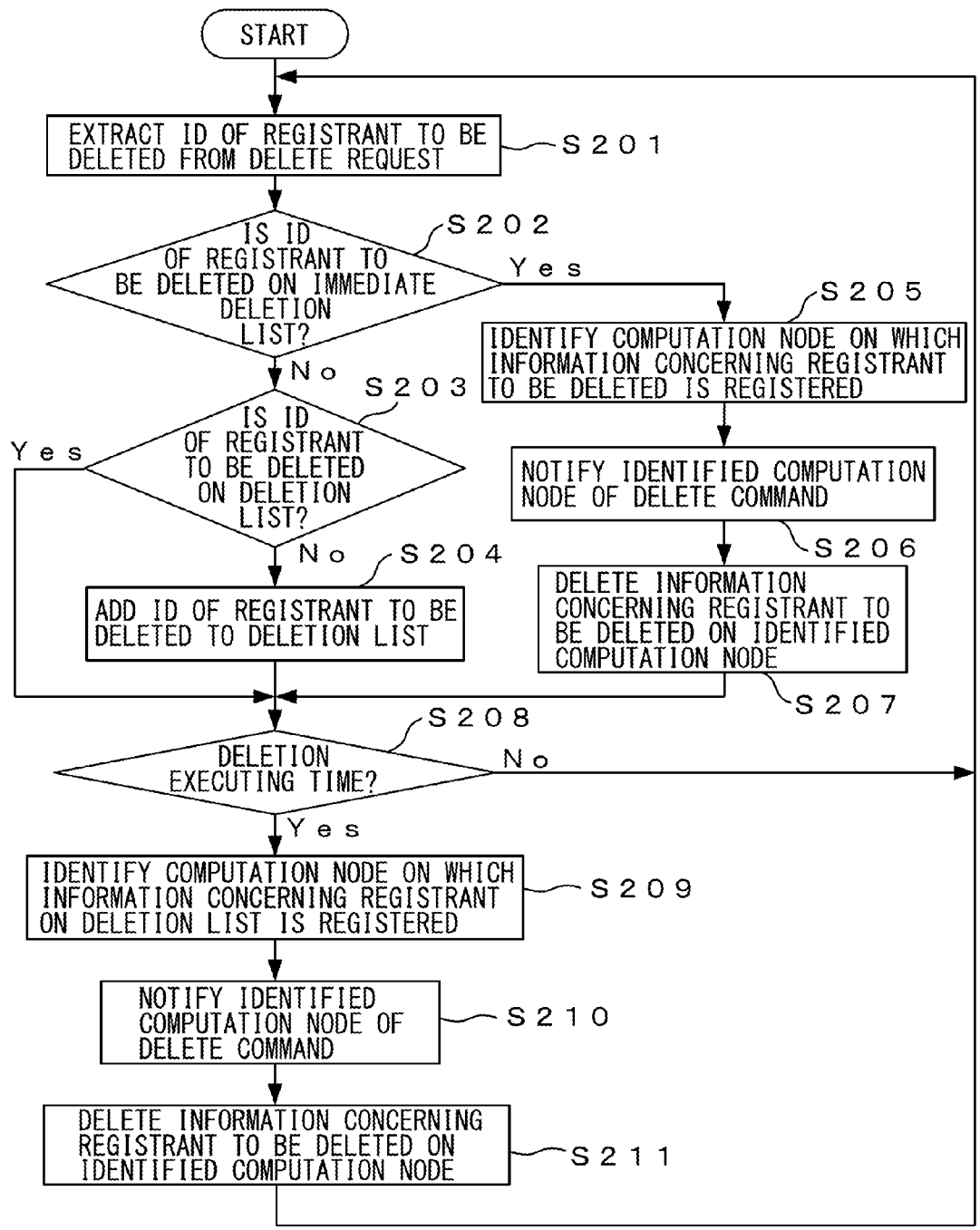
FIG. 10 is an operation flowchart of a registered information deletion process.

FIG. 10 is an operation flowchart of the registered information deletion process. When the deletion list registration unit 52 of the head node 32 receives a delete request from the management terminal 120 through the communication network 140 and the communication unit 31, the deletion list registration unit 52 extracts the identification information of the registrant to be deleted, that is included in the delete request (Step S201). The deletion list registration unit 52 determines whether or not the identification information of the registrant matches any of the identification information of the registrants registered on the immediate deletion list (Step S202).

Figure 11:
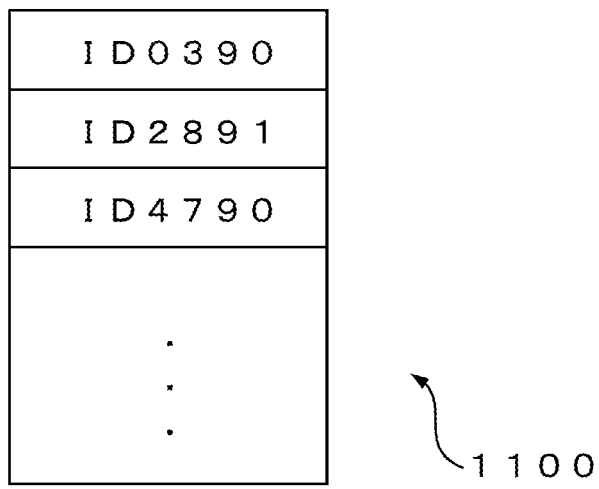
FIG. 11 is a diagram illustrating an example of an immediate deletion list.

FIG. 11 is a diagram illustrating one example of the immediate deletion list. The immediate deletion list 1100 contains the identification information of registrants having biometric information that tends to be determined to match biometric information of another person and is prone to cause incorrect authentication. In this example, the identification information of registrant, ID0390, ID2891, and ID4790 are on the immediate deletion list 1100.

When the identification information of the registrant to be deleted does not match any of the identification information of the registrants on the immediate deletion list (NO at Step S202), the biometric information of the registrant to be deleted is not biometric information that is prone to cause incorrect authentication. For example, when the identification information of the registrant to be deleted is not any of ID0390, ID2891, and ID4790, the biometric information of the registrant to be deleted is not prone to cause incorrect authentication. The deletion list registration unit 52 determines whether or not the identification information of the registrant to be deleted matches any of the identification information of the registrants on the deletion list (Step S203). When the identification information of the registrant to be deleted does not match any of the identification information of the registrants on the deletion list (NO at Step S203), the deletion list registration unit 52 adds the identification information of the registrant to be deleted to the deletion list (Step 204). On the other hand, when the identification information of the registrant to be deleted matches any of the identification information of the registrants on the deletion list (YES at Step S203), the deletion list registration unit 52 does not update the deletion list because the identification information of the registrant to be deleted has already been registered on the deletion list.

On the other hand, when the identification information of the registrant to be deleted matches the identification information of any of the registrants on the immediate deletion list at Step S202 (YES at Step S202), the biometric information of the registrant to be deleted is presumed to be prone to cause incorrect authentication. In this case, the deletion list registration unit 52 does not add the identification information of the registrant to be deleted to the deletion list but notifies the deletion instructing unit 53 of the identification information.

The deletion instructing unit 53 refers to an allocation list to identify the computation node on which features for selection and features for matching for the registrant having the identification information notified by the deletion list registration unit 52 are registered (Step S205). The deletion instructing unit 53 then notifies the identified computation node of a delete command instructing the computation node to delete the features for selection and the features for matching of the registrant along with the identification information of the registrant to be deleted (Step S206). The deletion instructing unit 53 deletes the identification information, features for selection, and features for matching of the registrant to be deleted from a registrant database of the head node 32.

The deletion executing unit 64 of the computation node to which the delete command is notified among the computation nodes 33-1 to 33-n deletes, from the storage unit 42, the notified identification information of the registrant and the corresponding features for selection and features for matching (Step S207).

Figure 12:
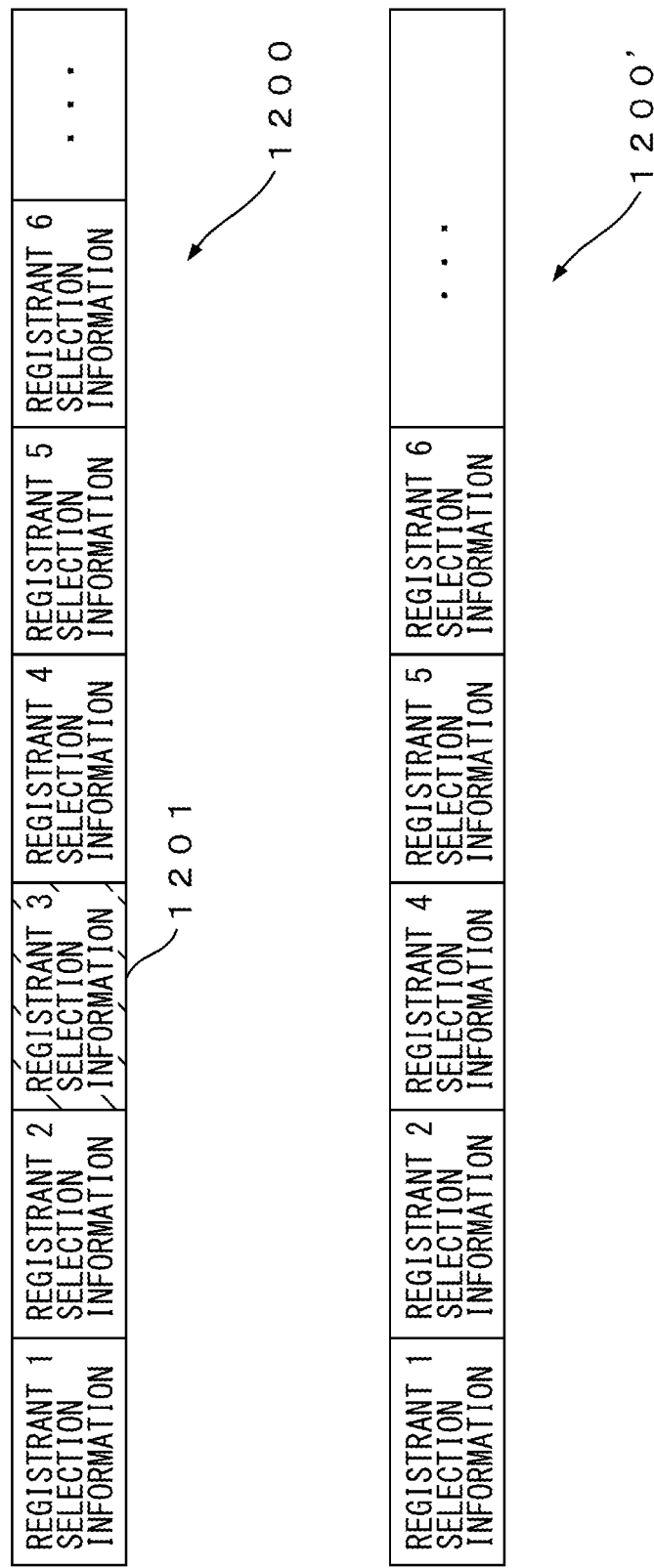
FIG. 12 is a conceptual diagram of a memory space storing features for selection in a storage unit of a computation node.

FIG. 12 is a conceptual diagram of a memory space storing features for selection in the storage unit 42 of a computation node. As illustrated in the upper part of FIG. 12, the features for selection of registrants are continuously arranged in the memory space 1200 so that the control unit 43 can continuously access the features for selection of the registrants for selecting registrants, thereby reducing the time for the memory access. Assume that registrant 3 is to be deleted. In this case, the deletion executing unit 64 deletes the features for selection of registrant 3 stored in memory space 1201. As indicated in a memory space 1200' after the deletion illustrated in the lower part of FIG. 12, The deletion executing unit 64 then moves registrant 4's features for selection and the subsequent features for selection one memory space to the left so that there is no empty space that breaks the continuity.

Referring again to FIG. 10, when the deletion list has not been updated at Step S204 or S203, or after Step S207, the deletion instructing unit 53 determines whether or not the current time is a preset deletion time (Step S208). When the current time is the deletion time (YES at Step S208), the deletion instructing unit 53 identifies, for the identification information of each registrant registered on the deletion list, the computation node on which the features for selection and features for matching of the registrant are registered (Step S209). The deletion instructing unit 53 then notifies the identified computation node of a delete command along with the identification information of the registrant to be deleted (Step S210). The deletion executing unit 64 of the computation node to which the delete command has been notified among the computation nodes 33-1 to 33-n, deletes the notified identification information of the registrant and the corresponding features for selection and features for matching from the storage unit 42 (Step S211). The deletion instructing unit 53 also deletes the identification information, features for selection, and features for matching of the registrant to be deleted from the registrant database of the head node 32.

Note that the deletion time is set in a time period in which computation load on the server 130 is relatively low, in the period between 11:00 PM and 5:00 AM, for example. This can prevent a delay in the biometric authentication process due to the execution of the process on the server 130 for deleting registered information such as registrants' features for selection.

After Step S211 or when the current time is not the delete time at Step S208 (NO at Step S208), the server 130 repeats Step S201 and the subsequent steps.

(Immediate Deletion List Update Process)

The immediate deletion list update unit 54 identifies registrants who are likely to have high degrees of similarity to another user or high scores of matching with another user on the basis of the execution result of the biometric authentication process. Every time when any of the registrants is determined to be a registrant prone to cause incorrect authentication, the immediate deletion list update unit 54 updates the immediate deletion list by adding the identification information of the registrant to the immediate deletion list. The immediate deletion list update unit 54 may perform the immediate deletion list update process at predetermined time (for example, at any time in the time period between 10:00 PM and 5:00 AM) when the computation load on the server 130 is relatively low.

When a registrant prone to cause incorrect authentication is to be deleted, the immediate deletion list update unit 54 preferably adds the registrant to the immediate deletion list when the computation load of immediately deleting the registrant is lower than the computation load of adding the registrant to the deletion list. This is because the computation load on the server 130 can be reduced appropriately according to registrants. Therefore, the immediate deletion list update unit 54 adds the identification information of a registrant that satisfies the condition for immediate deletion represented by the following equation to the immediate deletion list.

$$Td < N \times P(ID) \times Tms \qquad (2)$$

The deletion processing time Td is the time for deleting the identification information, features for selection, and features for matching of the registrant from any of the computation nodes. The deletion processing time Td is determined according to the throughput of the hardware of the computation node. On the other hand, the right-hand side of equation (2) represents an expected value of the total time for the respective selection processes and calculation of the degree of similarity when the matching score is calculated for each registrant. In other words, when the expected value of the total time for the respective selection processes and calculation of the degree of similarity when notifying the head node 32 of the identification information is longer than the deletion processing time Td, the identification information of the registrant is added to the immediate deletion list. The estimated authentication count N is an estimated value of the number of times the biometric authentication process is executed during a particular time period in which the frequency of authentication requests is high, for example, in the time period between 10:00 AM and 3:00 PM in a weekday. Further, the estimated authentication count N is set to the average of the number of times the biometric authentication process is executed during the particular time period in the past month or year, for example. The average total matching time Tms is the average total time for the respective selection processes and the calculation of the degree of similarity for one registrant in one execution of the biometric authentication process on the computation node. The average total matching time Tms may be the average total time for a predetermined number of past executions (for example, past 1000 to 10000 executions) of the selection processes and the calculation of the degree of similarity. The probability of sending to the head node P(ID) is the probability that the head node 32 will be notified of the identification information of the registrant by the computation node when the biometric authentication process is performed, i.e., the probability that the matching score will be calculated. The deletion processing time Td, the estimated authentication count N, and the average total matching time Tms may be considered substantially constant for any registrant. On the other hand, the probability of sending to the head node P(ID) is calculated for each individual registrant. For example, the probability of sending to the head node P(ID) may be calculated for each registrant by dividing the number of times the matching score of the registrant has been calculated by the number of times the matching request command has been sent to the computation node with reference to the count management table.

FIG. 13 is a diagram illustrating an example of the count management table. The count management table 1300 is one example of history information indicating past results of determination made by the authentication process unit for each of a plurality of registrants. The identification information of each registrant is stored in each cell of the leftmost column of the count management table 1300. The number of times the matching request command has been sent for the registrant having the identification information in the leftmost column is stored in the cell in the second column from the left. In the cell in the third column from the left, there is stored the number of times that the computation node notifies the head node of the identification information in the same row as the corresponding cell, i.e., the number of times that the matching score is to be calculated. To be exact, the number of times that the computation node notifies the head node of the identification information is not the same as the number of times that the matching score is to be calculated. This is because the matching score is not calculated for a registrant whose identification information is notified to the head node but is registered on the deletion list. However, information related to the biometric authentication process for a registrant whose identification information is registered on the deletion list will be deleted later and therefore such a registrant does not need to be taken into consideration. In the cell in the rightmost column of the count management table 1300, there is stored the probability of sending to the head node P(ID) for the registrant corresponding to the identification information indicated in the same row as the corresponding cell.

The immediate deletion list update unit 54 determines, for every registrant, whether or not the registrant satisfies the condition for immediate deletion given above. The immediate deletion executing unit 54 adds the identification information of registrants who satisfy the condition for immediate deletion to the immediate deletion list.

Note that there is a case where a registrant whose identification information is already registered on the immediate deletion list and no longer satisfies the condition for immediate deletion at the time of executing the latest immediate deletion list update process. In such a case, the immediate deletion list update unit 54 may delete the identification information of the registrant from the immediate deletion list. Further, there is also a case where a registrant whose identification information is already on the immediate deletion list and has not satisfied the condition for immediate deletion in more than one consecutive executions (for example, three to five executions) of the immediate deletion list update process. In such a case, the immediate deletion list update unit 54 may delete the identification information of the registrant from the immediate deletion list. Alternatively, the immediate deletion list update unit 54 may not delete the identification information of a registrant from the immediate deletion list for the registrant whose identification information is already registered on the immediate deletion list, even when the registrant no longer satisfies the condition for immediate deletion at the time of executing the latest immediate deletion list update process. This is because the biometric information of the registrant once added to the immediate deletion list is presumed to be more likely to cause incorrect authentication than the biometric information of other registrants.

Furthermore, when the identification information and other information such as selection information of a registrant is deleted from a computation node, the immediate deletion list update unit 54 may delete the identification information of the registrant from the immediate deletion list. This is because the identification information of the registrant who is no longer subjected to biometric authentication does not need to be managed.

FIG. 14 is an operation flow chart of the immediate deletion list update process. The immediate deletion list update unit 54 refers to the count management table to calculate the probability of sending to the head node P(ID) for each registrant (Step S301). The immediate deletion list update unit 54 determines, for each registrant, whether or not the registrant satisfies the condition for immediate deletion on the basis of the probability of sending to the head node P(ID), the deletion processing time Td, the estimated authentication count N, and the average total matching time Tms. The immediate deletion list update unit 54 identifies registrants who satisfy the condition for immediate deletion (Step S302). The immediate deletion list update unit 54 adds the identification information of the identified registrants to the immediate deletion list (Step S303). The immediate deletion list update unit 54 then ends the immediate deletion list update process.

As has been described above, when the server of the computer system receives a request to exclude an already registered registrant from biometric authentication, the server once adds the identification information of the registrant to the deletion list unless the identification information of the registrant included in the request is on the immediate deletion list. The server does not authenticate the user as any of the registrants whose identification information is registered on the deletion list. The server deletes the items of information of the registrants on the deletion list when the computation load is low. In this way, the computer system can prevent a delay in the biometric authentication process due to execution of the deletion process on information concerning the registrants, while preventing incorrect authentication of the user as a registrant requested to be deleted.

Furthermore, when the identification information of the registrant included in a delete request is registered on the immediate deletion list, the server immediately deletes the information concerning the registrant. In this way, the computer system can prevent the selection process and matching process for a registrant prone to cause incorrect authentication from being executed to the end and thus can further reduce the computation load.

According to a variation, the storage unit of each computation node may store the deletion list and the immediate deletion list. In addition, the control unit of each computation node may implement the functions of the deletion list registration unit 52 and the immediate deletion list update unit 54.

In this case, when receiving a delete request from the management terminal 120 through the communication network 140 and the communication unit 31, the deletion instructing unit 53 of the head node 32 extracts the identification information of the registrant to be deleted included in the delete request. The delete instructing unit 53 then refers to the allocation table to identify the computation node on which the information concerning the registrant to be deleted is registered and transfers the delete request to the identified computation node.

The deletion list registration unit 52 of the computation node that has received the deletion request determines whether or not the identification information of the registrant to be deleted included in the delete request is registered on the immediate deletion list. When the identification information of the registrant to be deleted is not registered on the list, the deletion list registration unit 52 adds the identification information of the registrant to the deletion list. At predetermined time when the computation load is low, the deletion executing unit 64 deletes the identification information of the registrant registered on the deletion list, the corresponding features for selection and features for matching from the storage unit 42.

On the other hand, when the identification of the registrant to be deleted is on the immediate deletion list, the deletion executing unit 64 immediately deletes the identification information of the registrant to be deleted, the corresponding features for selection and features for matching from the storage unit 42.

Note that the computation node that has deleted the identification information of the registrant, the corresponding features for selection and features for matching may notify the head node of the identification information of the deleted registrant. Then, the head node may delete the notified identification information of the registrant and other items of information from the registrant database in a time period in which the computation load is relatively low.

In this variation, the immediate deletion list update unit 54 of each computation node may consider the time for the primary selection process, the time for the secondary selection process, and the time for the matching process separately to determine whether or not the condition for immediate deletion is satisfied. For example, the immediate deletion list update unit 54 may determine whether or not the condition for immediate deletion is satisfied according to the equation given below instead of equation (2).

$$Td < N \times Tm1 + N \times P_1(ID) \times Tm2 + N \times P_1(ID) \times P_2(ID) \times Tmm \quad (3)$$

The deletion processing time Td and the estimated authentication count N are the same as the deletion processing time Td and the estimated authentication count N in equation (2). The average primary selection processing time Tm1 is the average time for the primary selection process by the primary selection unit 61 in one execution of the biometric authentication process. For example, the average primary selection processing time Tm1 may be the average of the predetermined number of times of past executions (for example, 1000 to 10000 executions) for the primary selection process. The average secondary selection processing time Tm2 is the average time for the secondary selection process by the secondary selection unit 62 in one execution of the biometric authentication process. For example, the average secondary selection processing time Tm2 may be the average of the predetermined number of times of past executions for the secondary selection process. Similarly, the average matching processing time Tmm is the average time for the matching process by the matching unit 63 in one execution of the biometric authentication process and may be the average of the predetermined number of times of past executions for the matching process, for example. The primary selection probability $P_1(ID)$ is the probability that the registrant will be selected in the primary selection process when the biometric authentication process is executed. The secondary selection probability $P_2(ID)$ is the probability that the registrant will be selected in the secondary selection process when the biometric authentication process is executed. The primary selection probability $P_1(ID)$ and the secondary selection probability $P_2(ID)$ are calculated for each registrant. The control unit 43 of each computation node therefore records, for each of the registrants registered on the computation node, identification information, the number of times that the biometric authentication process has been requested, the number of times that the registrant has been selected in the primary selection process, and the number of times that the registrant has been selected in the secondary selection process, in the storage unit 42. Each time the immediate deletion list update unit 54 executes the immediate deletion list update process, the immediate deletion list update unit 54 calculates the primary selection probability $P_1(ID)$ by dividing the number of times that the registrant has been selected in the primary selection process by the number of times that the biometric authentication process has been requested. Similarly, the immediate deletion list update unit 54 calculates the secondary selection probability $P_2(ID)$ by dividing the number of times that the registrant has been selected in the secondary selection process by the number of times that the registrant has been selected in the primary selection process.

The time for each selection process and the time for the matching process may differ depending on registrants. In that case, each time each of the selection processes and the matching process is executed, the control unit 43 of the computation node may store, for each registrant, the time for each of the processes in the storage unit 42. The control unit 43 may respectively average the amounts of time for each of the selection processes and the matching process to calculate the average primary selection processing time Tm1, the average secondary selection processing time Tm2, and the average matching processing time Tmm.

In the variation, the computer system can more properly determine which case, immediately deleting registered information or deleting the registered information later, puts the lower computation load on the computer system.

According to another variation, the immediate deletion list may not be generated. In that case, when the server receives a request to delete a registrant, the server may add the identification information of the registrant included in the delete request to the deletion list without making the determination at Step S202 of FIG. 10.

Note that according to a variation, the control unit 15 of the authentication requesting terminal 110 may extract features for selection and features for matching from biometric data of the user. The control unit 15 may then send the features for selection and the features for matching to the server 130 through the communication unit 14 along with the identification information of the authentication requesting terminal 110. This reduces the computation load on the server 130 and the traffic on the communication network 140 in the biometric authentication process.

The registrant database may be provided separately from the head node and the computation nodes, and may be stored in a file server that can communicate with the head node and the computation nodes through the local area network 34.

While registrants to be matched are selected in two-stage selection process in the embodiments described above, the number of stages for selection process is not limited to two; a single-stage selection process or three-stage selection process may be performed. Alternatively, the selection process itself may be omitted.

According to yet another variation, a single server may execute the selection processes, the matching process, and the authentication process for all registrants. Further, the biometric authentication apparatus may be implemented as a single standalone computer. In that case, the computer which serves as the biometric authentication apparatus includes a biometric information acquisition unit. In addition, a storage unit of the computer stores features for selection and features for matching for all registrants, and the various lists and tables described above. The processor of the computer executes the biometric authentication process, the registered information deletion process, and the immediate deletion list update process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A biometric authentication apparatus comprising:
    a storage device which stores identification information and authentication information of each of a plurality of registrants, the authentication information being obtained from biometric information of each of the plurality of registrants;
    at least one processor configured to:
        register, when receiving a delete request to delete the authentication information for any of the plurality of registrants, the identification information of the registrant to a deletion list,
        delete, from the storage device, the authentication information of the registrant corresponding to the identification information registered on the deletion list at predetermined time; and
        match the biometric information of each registrant of which the identification information is not registered on the deletion list among the plurality of registrants with biometric information of a user based on the authentication information of the each registrant and authentication information extracted from biometric data representing the biometric information of the user acquired by a biometric information acquisition device and not match the biometric information of each registrant of which the identification information is registered on the deletion list among the plurality of registrants with the biometric information of the user to determine whether or not to authenticate the user as any of the plurality of registrants other than the registrants corresponding to the identification information registered on the deletion list.

2. The biometric authentication apparatus according to claim 1, wherein
    the storage device further stores an immediate deletion list on which identification information of a registrant whose authentication information is deleted when receiving the delete request is registered; and
    deleting the authentication information of the registrant determines whether or not the identification information of a registrant specified in the delete request matches any of the identification information registered on the immediate deletion list, and deletes the authentication information of the specified registrant from the storage device without registering the identification information of the specified registrant to the deletion list, when the identification information of the specified registrant matches any of the identification information registered on the immediate deletion list.

3. The biometric authentication apparatus according to claim 2, wherein the at least one processor further configured to decide a registrant whose identification information is to be registered to the immediate deletion list based on history information indicating past results of authentication determination for each of the plurality of registrants.

4. The biometric authentication apparatus according to claim 3, wherein
    the storage device stores, for each of the plurality of registrants, a selection feature representing a feature of biometric information of the registrant;
    the matching includes:
        extracting a user selection feature representing a feature of biometric information of the user from the biometric data of the user, selecting registrants having the selection feature that matches the user selection feature, calculating, for each of the selected registrants, degree of similarity between the biometric information of the registrant and the biometric information of the user, calculating a matching score from the degree of similarity for each registrant of which the identification information is not registered on the deletion list among the selected registrants, and authenticating the user as a registrant corresponding to a maximum value of the matching score when the maximum value of the matching score is greater than a threshold value; and wherein the history information includes number of times that the matching score is calculated for each of the plurality of registrants; and deciding a registrant whose identification information is to be registered to the immediate deletion list refers to the history information to calculate an expected value of time for calculating the degree of similarity of each of the plurality of registrants in one execution of a process by of the matching, and registers, to the immediate deletion list, the identification information of a registrant, among the plurality of registrants, for whom the expected value is greater than the time for deleting the authentication information of the registrant from the storage device.

5. The biometric authentication apparatus according to claim 4, further comprising a first apparatus which comprises a first processor among the at least one processor configured to execute the matching, and a plurality of second apparatuses which are communicatively connected to the first apparatus, wherein each of the plurality of second apparatuses comprises a second processor among the at least one processor configured to execute extracting of the user selection feature the matching for registrants different from each other among the plurality of registrants, wherein the second processor of each of the plurality of second apparatuses performs the selection and the calculation of the degree of similarity for registrants whose identification information is not registered on the deletion list among the plurality of registrants.

6. The biometric authentication apparatus according to claim 5, wherein the second processor of each of the plurality of second apparatuses is further configured to execute deciding of a registrant whose identification information is to be registered to the immediate deletion list.

7. The biometric authentication apparatus according to claim 6, wherein the history information includes, for each of the plurality of registrants, number of times that the registrant is selected and number of times that the matching score is calculated;

each of the plurality of second apparatuses notifies the first apparatus of the identification information and the degree of similarity of registrants whose degree of similarities are equal to or greater than a similarity threshold value;

the first processor of the first apparatus calculates the matching scores for the registrants whose identification information is notified; and the second processor of each of the second apparatuses refers to the history information to calculate the expected value for each of the plurality of registrants, the expected value being a sum of a product of a probability obtained by dividing number of times that the registrant is selected by number of times that biometric authentication is performed and the time for the selection, and a product of a probability obtained by dividing number of times that the degree of similarity is equal to or greater than a predetermined threshold value by the number of times that the registrant is selected and the time for calculating the degree of similarity.

8. A biometric authentication method comprising:

when receiving a delete request, for any of a plurality of registrants, to delete authentication information obtained from biometric information of the registrant, registering identification information of the registrant on a deletion list;

deleting, at predetermined time, the authentication information of the registrant corresponding to the identification information registered on the deletion list from a storage device which stores the identification information and the authentication information of each of the plurality of registrants; and matching the biometric information of each registrant of which the identification information is not registered on the deletion list among the plurality of registrants with biometric information of a user based on the authentication information of the each registrant and authentication information extracted from biometric data representing biometric information of a user acquired by a biometric information acquisition device and not matching the biometric information of each registrant of which the identification information is registered on the deletion list among the plurality of registrants with the biometric information of the user to determine whether or not to authenticate the user as any of the plurality of registrants other than the registrants corresponding to the identification information registered on the deletion list.

9. The biometric authentication method according to claim 8, wherein the storage device further stores an immediate deletion list on which identification information of a registrant whose authentication information is deleted when receiving the delete request is registered; and deleting the authentication information of the registrant determines whether or not the identification information of a registrant specified in the delete request matches any of the identification information registered on the immediate deletion list, and deletes the authentication information of the specified registrant from the storage device without registering the identification information of the specified registrant to the deletion list, when the identification information of the specified registrant matches any of the identification information registered on the immediate deletion list.

10. The biometric authentication method according to claim 9, further comprising:

deciding a registrant whose identification information is to be registered to the immediate deletion list based on history information indicating past results of authentication determination for each of the plurality of registrants.

11. The biometric authentication method according to claim 10, wherein the storage device stores, for each of the plurality of registrants, a selection feature representing a feature of biometric information of the registrant;

the matching comprises:
- extracting a user selection feature representing a feature of biometric information of the user from the biometric data of the user;
- selecting registrants having the selection feature that matches the user selection feature;
- calculating, for each of the selected registrants, degree of similarity between the biometric information of the registrant and the biometric information of the user;
- calculating a matching score from the degree of similarity for each registrant of which the identification information is not registered on the deletion list among the selected registrants; and
- authenticating the user as a registrant corresponding to a maximum value of the matching score when the maximum value of the matching score is greater than a threshold value; and wherein the history information includes number of times that the matching score is calculated for each of the plurality of registrants; and the deciding a registrant whose identification information is to be registered to the immediate deletion list refers to the history information to calculate an expected value of time for calculating the degree of similarity of each of the plurality of registrants in one execution of a process of the matching the biometric information of the plurality of registrants with the biometric information of the user, and registers, to the immediate deletion list, the identification information of a registrant, among the plurality of registrants, for whom the expected value is greater than the time for deleting the authentication information of the registrant from the storage device.

12. A non-transitory computer-readable recording medium having recorded thereon a computer program for biometric authentication that causes a computer to execute a process comprising:
- when receiving a delete request, for any of a plurality of registrants, to delete authentication information obtained from biometric information of the registrant, registering identification information of the registrant on a deletion list;
- deleting, at predetermined time, the authentication information of the registrant corresponding to the identification information registered on the deletion list from a storage device which stores the identification information and the authentication information of each of the plurality of registrants; and
- matching the biometric information of each registrant of which the identification information is not registered on the deletion list among the plurality of registrants with biometric information of a user based on the authentication information of the each registrant and authentication information extracted from biometric data representing biometric information of a user acquired by a biometric information acquisition device and not matching the biometric information of each registrant of which the identification information is registered on the deletion list among the plurality of registrants with the biometric information of the user to determine whether or not to authenticate the user as any of the plurality of registrants other than the registrants corresponding to the identification information registered on the deletion list.

\* \* \* \* \*